United States Patent
Seymour et al.

(10) Patent No.: US 6,438,814 B1
(45) Date of Patent: Aug. 27, 2002

(54) METHOD OF FORMING A CONNECTION BETWEEN A TUBE AND A FITTING

(76) Inventors: Michael Douglas Seymour, Pear Tree Lodge, 2A Scrimshire Lane, Cotgrave, Nottinghamshire (GB), NG12 3JD; Musa Mihsein, Latymer, Links Road, Tettenhall, Wolverhampton WV6 90F (GB)

( * ) Notice: Subject to any disclaimer, the term of this patent is extended or adjusted under 35 U.S.C. 154(b) by 0 days.

(21) Appl. No.: 09/640,300

(22) Filed: Aug. 16, 2000

(30) Foreign Application Priority Data

Aug. 17, 1999 (GB) .............................................. 9919295

(51) Int. Cl.$^7$ .............................................. B23Q 17/00
(52) U.S. Cl. ................. 29/407.02; 29/407.01; 29/407.05; 29/407.07; 285/249; 285/382.7
(58) Field of Search ........................ 29/407.01, 407.02, 29/407.03, 407.04, 407.05, 407.07, 407.08, 407.09, 407.1, 428; 116/200, 201, 202, 212, 312; 285/93, 249, 382.7

(56) References Cited

U.S. PATENT DOCUMENTS

| | | | |
|---|---|---|---|
| 3,103,373 A | * | 9/1963 | Lennon et al. ............... 285/342 |
| 3,325,192 A | * | 6/1967 | Sullivan ...................... 285/93 |
| 4,127,927 A | * | 12/1978 | Hauk et al. ............... 29/407.02 |
| 4,365,402 A | * | 12/1982 | McCombs et al. ........ 29/407.02 |
| 4,592,125 A | * | 6/1986 | Skene ...................... 29/407.02 |
| 4,614,120 A | * | 9/1986 | Fradin et al. ................. 73/761 |
| 4,655,159 A | | 4/1987 | McMills |
| 4,700,576 A | * | 10/1987 | Grare et al. ................... 73/761 |
| 4,962,579 A | * | 10/1990 | Moyer et al. ............ 29/407.02 |
| 5,074,599 A | * | 12/1991 | Wirbel et al. ................. 285/93 |
| 5,233,742 A | * | 8/1993 | Gray et al. .............. 29/407.02 |
| 5,280,967 A | * | 1/1994 | Varrin, Jr. ..................... 285/93 |
| 6,279,242 B1 | * | 8/2001 | Williams et al. ......... 33/501.45 |
| 6,345,845 B2 | * | 2/2002 | Johnston .................. 285/382.7 |

FOREIGN PATENT DOCUMENTS

| | | |
|---|---|---|
| GB | 1 361 372 | 7/1974 |
| GB | 2 264 762 A | 9/1993 |

* cited by examiner

Primary Examiner—S. Thomas Hughes
Assistant Examiner—Essama Omgba
(74) Attorney, Agent, or Firm—Marshall, Gerstein & Borun

(57) ABSTRACT

A method of forming a connection between a tube and a fitting, in which the fitting including a body with an externally male threaded tube receiving part to receive a tube, and a female threaded member adapted to be engaged with the male thread of the body with a compression means therebetween, the method including the steps of arranging the female threaded member and the compression means around the tube, inserting the tube into the tube receiving part of the body, and tightening the female threaded member onto the tube receiving part so that a generally radially inwardly extending formation of the female threaded member bears upon the compression means and wherein the method includes determining the amount of movement of a part of the fitting which, as the female threaded member is tightened, is caused to move relative to another part of the fitting.

19 Claims, 5 Drawing Sheets

METHOD OF FORMING A CONNECTION BETWEEN A TUBE AND A FITTING

BACKGROUND TO THE INVENTION

This invention relates to a method of forming a connection between a tube and a fitting, and to a connection between a tube and a fitting.

DESCRIPTION OF THE PRIOR ART

So-called compression fittings are known, in which a female threaded member through which a tube extends, is tightened onto a male thread of a body of the fitting, the male thread being provided on an exterior surface of a tube receiving formation of the body into which formation an end of the tube is received. Tightening of the female threaded member causes deformation of an annular compression means positioned between the body and the female threaded member to form a seal with the tube. The body may be a straight or elbow tube connector for example, a valve, gauge or any other fitting to which it is required to connect a tube.

For high pressure installations, i.e. installations in which the fluid pressure in the tube may be in the order of 10,000 psi, the compression means may be first and second interacting compression elements. Typical installations in which high pressure tube fittings are used, are in the oil, gas or chemical industries.

Typically, the first element is urged into engagement between an internal surface of the tube receiving formation, and the tube, by the second element upon which a radially inwardly extending shoulder formation of the female threaded element bears as the female threaded element is tightened onto the body.

Such high pressure tube fittings have been proven by the test of time, to operate adequately, although there are potential problems.

First, tightening of the female threaded element an amount to conform to design specification, is critical to correct operation of the fitting. Overtightening of the female threaded element can lead to the first element causing tube damage, which can result in sudden and dangerous tube failure under pressure. Undertightening can result in fluid leakage, or more seriously, total failure of the connection, again with potentially dangerous consequences.

Thus it is usual for the amount of rotation of the female threaded member relative to the body to achieve a predetermined tightness beyond finger tightness, to be specified. Judging finger tightness and the amount of rotation in sometimes hostile environments in which such high pressure fittings are used, can be very difficult, but in any event, a correct tightening operation relies entirely on the skill of the fitter.

Second, particularly when such connections are repaired or replaced, for example when an installation is modified, it is not unknown for one or more component parts of one manufacturer's tube fitting to be replaced with corresponding component parts from another manufacturer. Because different manufacturers produce tube fittings in which the component parts are not designed to be mixed with component parts of another manufacturer, or at least it has been shown by work carried out by the inventors that component parts from one manufacturer should not be used in conjunction with other than component parts made by the same manufacturer, interchanging component parts can again lead to inadequate and potentially dangerous connections in high pressure applications.

SUMMARY OF THE INVENTION

According to one aspect of the invention we provide a method of forming a connection between a tube and a fitting, the fitting including a body with an externally male threaded tube receiving part to receive a tube, and a female threaded member adapted to be engaged with the male thread of the body with a compression means therebetween, the method including the steps of arranging the female threaded member and the compression means around the tube, inserting the tube into the tube receiving part of the body, and tightening the female threaded member onto the tube receiving part so that a generally radially inwardly extending formation of the female threaded member bears upon the compression means, the method being characterised in that the method includes determining the amount of movement of a part of the fitting which, as the female threaded member is tightened is caused to move relative to another part of the fitting.

The method may include monitoring relative movement of the part as the female threaded member is tightened, and continuing to tighten the female threaded member until the part has relatively moved a predetermined extent.

Thus by calibration to determine a predetermined extent of relative movement of the part of the fitting corresponding to a desired male thread/female threaded member tightness, by the method of the present invention correct tightening of the female threaded member can be more consistently achieved resulting in more reliable and thus safer connections.

Moreover, monitoring of the deformation of the part of the fitting may reveal that component parts of the connection from different manufacturers have been used, for example if the predetermined extent of movement cannot be achieved, or is achieved without an adequate or corresponding rotation of the female threaded member.

The invention is particularly but not exclusively concerned with a high pressure fitting, by which we mean a fitting adapted for use in installations where fluids having pressures of at least 100 psi pass through the connection.

The compression means may thus include first and second annular compression elements, the second element interacting with the first element as the female threaded member is tightened, to urge the first element into engagement between the tube receiving formation and the tube.

In one arrangement, the part the amount of relative movement of which is determined, is the generally radially inwardly extending formation of the female threaded member which when the female threaded member is tightened, moves relative to the remainder of the female threaded member generally axially of the connection. In this case, in order that measurable deformation of the part of the fitting occurs, the method may include providing the female threaded member of the fitting with a weakened region located such that as the female threaded member is tightened, movement of the formation is enhanced.

Preferably though, the weakened region is provided so as only to permit deformation of the formation within the elastic limit of the material from which the fitting is made.

The weakened region may include an annular groove provided in a region of the female threaded member where the radially inwardly extending formation joins the remainder of the female threaded member. Such groove is preferably provided in an internal surface of the female threaded member, e.g. axially adjacent to the thread.

In another arrangement part the amount of relative movement of which is determined, is an axially extending portion of the female threaded member which moves axially of the connection when the female threaded member is tightened. Thus the invention may include axially stretching the female threaded member relatively to move the axially extending portion thereof.

In this case, the method may include forming a circumferential groove in an external surface of the female threaded member, and determining a change in the axial length of the groove arising as a result of tightening of the female threaded member.

In yet another example, the part the amount of relative movement of which is determined, is a portion of the compression means, such as a rear portion of the second annular compression element on which the radially inwardly extending formation bears, which as the female threaded member is tightened, is deformed to move into a space between the female threaded member and the tube.

Thus the method may include providing a circular opening in the female threaded member of a first diameter, to receive the tube, which diameter is greater than is required to receive the tube, to provide an enlarged space into which the rear portion of the second annular compression element may deform, to facilitate movement of the part.

The part, the amount of relative movement of which is determined may be a portion of the compression means which moves axially towards the body as the female threaded member is tightened and may be a portion of the first or second annular compression element.

The method may include forming an opening in the female threaded member at a position such that movement of the portion of the compression means which moves as the female threaded member is tightened may be monitored. Such opening may be provided in a side wall of the female threaded member, or in the generally radially inwardly extending formation.

Determining the amount of relative movement can be performed by any one of or a combination of methods, including optically determining the movement of the part of the fitting, for example using an optical instrument which produces a light beam which is deflected or reflected to measure movement of the part, ultrasonic means acoustically to measure such movements for example using an instrument which produces ultrasonic vibrations which are reflected from the part of the fitting, the nature and/or direction of the reflections changing as the part moves, or even a mechanical measuring instrument which mechanically measures the amount of movement of the part.

In each case preferably the instrument is operated in conjunction with a tool which is used to tighten the female threaded member. For example, the tool and the instrument may be integrated.

According to a second aspect of the invention we provide a method of monitoring a connection formed by the method of the first aspect of the invention characterised in that the method includes providing data including a measurement of the amount of movement of the part of the fitting achieved during tightening of the female threaded member, to a data storage means, reexamining the connection to determine any change of position of the moveable part occurring since tightening.

Thus in critical situations, such as critical connections in a nuclear power plant or where toxic gases or liquids are being contained, long term monitoring of the connection can be carried out.

The method may include providing the connection with a monitoring means which provides a signal to the data storage means in the event that a movement of the movable part subsequent to tightening, beyond a threshold amount, is determined. The threshold amount may be determined by the detection ability of the monitoring means, or the monitoring means may determine intelligently, whether or not to send a signal to the data storage means.

Preferably the data storage means includes a processing means and thus has computing power, and the method includes providing a warning in the event that a movement of the moveable part subsequent to tightening, beyond a threshold amount, is determined, thus to give early warning of potential connection failure.

According to a third aspect of the invention we provide a connection between a tube and a fitting for use in the method of the first aspect of the invention, the part of the connection which is monitored including a weakened region, which enhances deformation of the part of the fitting within the elastic limit of the material from which the part of the fitting is made, as the female threaded member is tightened.

According to a fourth aspect of the invention we provide a connection between a tube and a fitting for use in the method of the first aspect of the invention, characterised in that an opening is provided in the female threaded member through which movement of the part can be determined.

BRIEF DESCRIPTION OF THE DRAWINGS

The invention will now be described with reference to the accompanying drawings in which.

DETAILED DESCRIPTION OF THE PREFERRED EMBODIMENT

Figure 1:
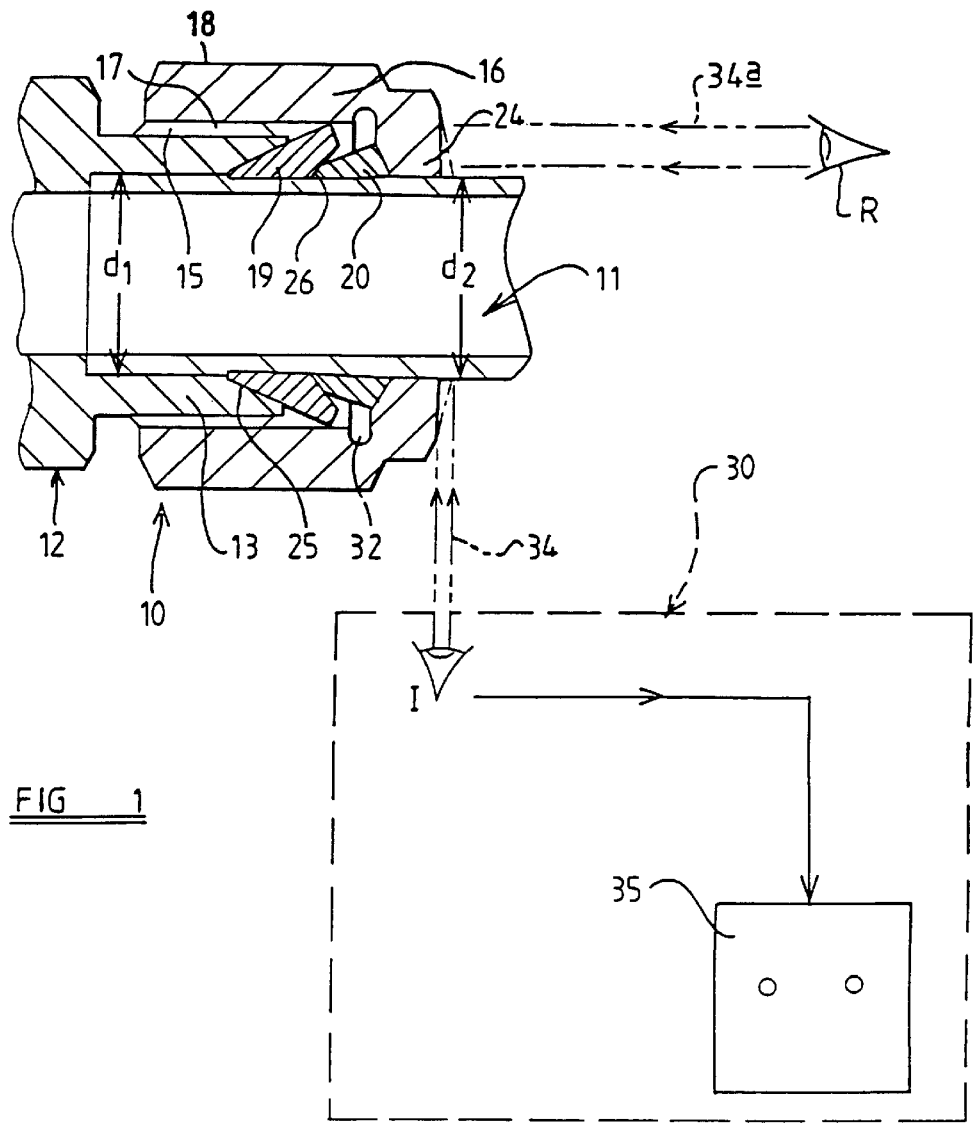
FIG. 1 is a cross sectional view through a tube/fitting connection achieved by the method of the invention.
Figure 2:
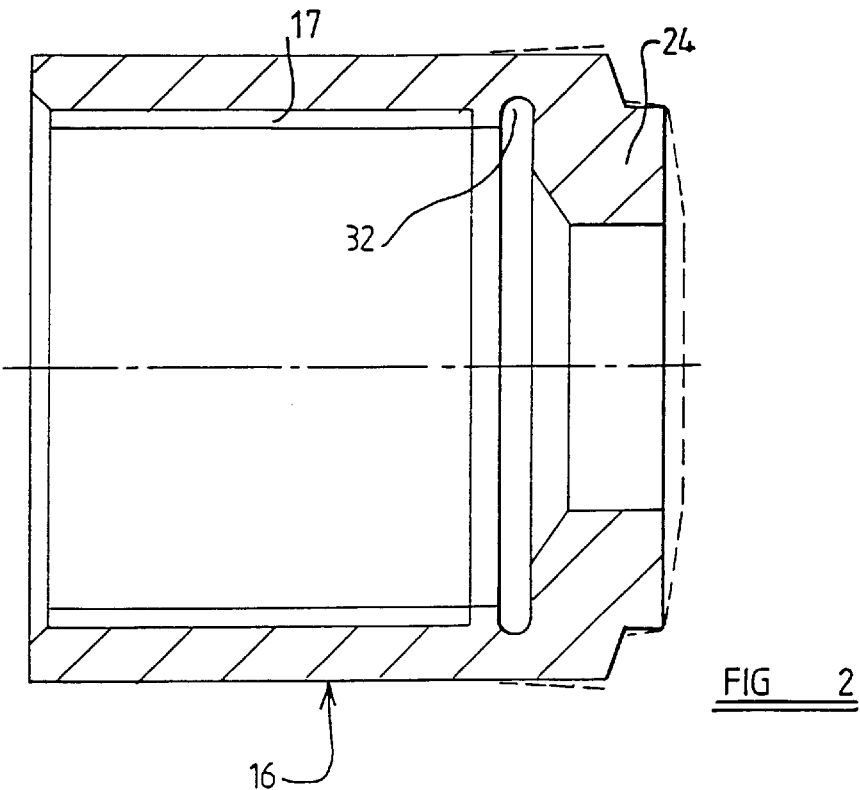
FIG. 2 is a cross sectional view through a female threaded member which may particularly be used in the method of the invention.
Figure 3:
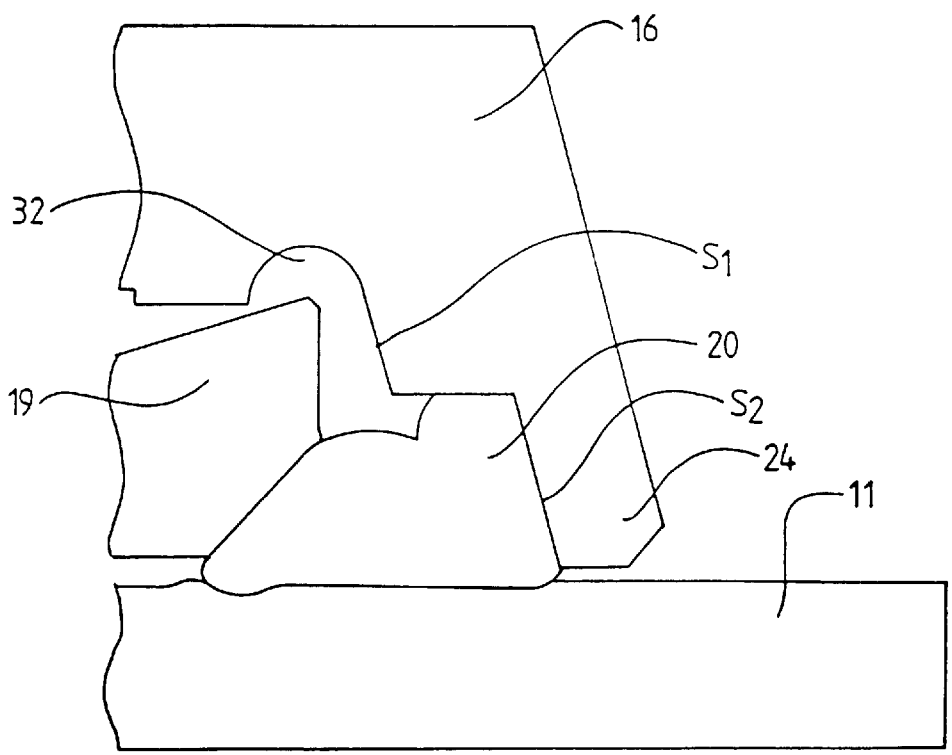
FIG. 3 is a side illustrative cross sectional view through a connection in accordance with the invention, to illustrate a way in which movement of a part of the fitting may be determined.

Referring to FIGS. 1 to 3 of the drawings, a fitting 10 adapted to be connected to a tube 11, includes a body 12 with an integral tube receiving part 13. The fitting may be for examples only, a straight connector or elbow connector for connecting two tubes 11 together end to end or at an angle to one another, or the fitting 10 may be a valve, a gauge or any other fitting to which it is desired to connect a tube 11 or tubes 11 in fluid tight manner.

The tube 11, for a typical high pressure installation, may be a seamless tube made of a material such as stainless steel, the tube 11 conforming to an appropriate manufacturing standard such that the tube 11 is capable of conveying fluids, such as oil or gas, at high pressures, by which we mean pressures of up to 10,000 psi typically. The invention is however applicable to installations in which higher or lower fluid pressures are encountered.

The fitting 10 too may typically be made of stainless steel and may be made by machining or another suitable fabrication method.

The tube receiving part 13 is formed with a male thread 15 on an external surface thereof, and a radial internal dimension d1 of the tube receiving part 13 is only slightly greater than an external dimension d2 of the tube 11, such that the tube 11 is a close fit within the tube receiving part 13 of the body 12.

The fitting 10 further includes a female threaded member 16 which has a female thread formed on an internal surface 17 of the member 16, the female thread being adapted to co-operate with the male thread of the tube receiving part 13 of the body 12. An external surface 18 of the female threaded member 16 may be provided with flats or may otherwise be configured to enable the female threaded member 16 to co-operate with a tool by means of which the female threaded member 16 may be tightened onto the body 12, by being rotated.

The fitting 10 further includes a compression means including a first annular compression element 19 which is received around the tube 11, and an adjacent generally annular second compression element 20, the first and second compression elements 19, 20 being located between a radially inwardly extending shoulder formation 24 of the female threaded member 16, and the tube receiving part 13 of the body 12, with the first compression element 19 closer to the body 12 and the second compression element 20 closer to the radially inwardly extending formation 24 of the female threaded member 16.

The first compression element 19 is tapered in cross section so that a leading edge 25 of the first compression element 19, which is of minimum thickness, is adapted to be engaged between the tube 11 and the tube receiving part 13 of the body 12. As the first compression element 19 is urged axially towards the body 12, the first compression element 19 will become increasingly tightly engaged with the tube 11 and the tube receiving part 13 of the body 12 to form a substantially fluid tight seal.

The second compression element 20 is adapted to be engaged by the radially inwardly extending formation 24 of the female threaded member 16 as the female threaded member is tightened, and is urged axially towards and into engagement with the first compression element 19. The first and second compression elements 19, 20 are adapted to interact such that the engagement between the first compression element 19 and each of the tube 11 and tube receiving part 13 of the body 12, is optimised. In different manufacturers' fittings 10, the manner in which the first and second compression elements interact may be subtly different, but in general, as seen in the example of the drawings, there is provided a small annular recess 26 between the first compression element 19 and the tube 11 at a trailing edge of the compression element 19, into which the second compression element 20 is urged as the female threaded member 16 is tightened. The recess 26 and the second compression element 20 are of corresponding generally wedge-like form and so the first and second compression elements 19, 20 as the female threaded member 16 is tightened, interact so that the leading edge of the first compression element 19 is pushed into the surface of the tube 11.

It will be appreciated that an optimum connection between the fitting 10 and the tube 11 is achieved by tightening the female threaded element 16 to a design tightness.

Generally, in connections of the kind with which this invention is primarily but not exclusively concerned, i.e. having a compression means including first and second compression elements 19, 20 which interact, desired tightness of the female threaded member 16 for an optimum connection, is specified in terms of the amount of rotation of the female threaded member 16 beyond finger tightness. It is inappropriate to specify torque because it is the spatial relationship between the two elements 19, 20 of the compression means and of the tube receiving part 13 of the body 12 which tends to be the dominant factor in achieving a connection to design specification.

In accordance with the invention, as the female threaded member 16 is tightened, deformation of a part of the fitting 10 is monitored by a monitoring means, and tightening is continued until the part of the fitting 10 has deformed to a predetermined extent. Deformation of any part of the fitting 10 is dependant on the spatial relationship of the component parts. By careful calibration of such monitoring means, a relationship between deformation of the part of the fitting and optimum tightness of the female threaded member 16 can be established. Thus rather than relying on the skill of a fitter to rotate female threaded member a predetermined amount, use of such a monitoring means can enable optimally tightened connections more reliably and consistently to be achieved, even by less-skilled fitters.

As the female threaded member 16 is tightened, various parts of the fitting 10 will become deformed from a datum position. For example, the body 12 of the fitting 10, and particularly the tube receiving part 13 thereof will be deformed outwardly as the first compression element 19 is urged between the tube receiving part 13 and the tube 11. However in one embodiment of the invention, shown in FIGS. 1 and 2, the part of the fitting 10 which is monitored is the radially inwardly extending shoulder formation 24 of the female threaded member 16 which bears on the second compression element 20. As indicated in FIG. 1, as the female threaded member 16 is tightened axially, the inwardly extending shoulder formation 24 will be deformed outwardly axially. Hence using a suitable monitoring means such as illustrated at 30, the extent of deformation can be monitored.

Where the amount of deformation of the shoulder formation 24 or other part to be monitored, is insufficient for meaningful measurement, the part may be adapted to enhance the deformation.

Referring particularly to FIG. 2, the female threaded member 16 is provided with a weakened region 32 in a position where the inwardly extending formation 24 joins to the remainder of the female threaded member 16. The weakened region 24 in this example is an annular groove machined in the internal surface of the female threaded member 16 at a location axially adjacent to the female thread 17. By virtue of the provision of the groove 32 or other weakened region, as the female threaded member 16 is tightened, the extent of deformation of the shoulder formation 24 will be enhanced. The weakening is, however, designed not to weaken the female threaded member 16 to such an extent as to encourage failure of the shoulder 24. Preferably, the weakening is such that the shoulder 24 is not weakened to an extent that deformation beyond the elastic limit of the material from which the female threaded member 16 is made, is possible.

Thus the position and depth of the groove 32 or other configuration of weakened region 32 needs carefully to be designed and accurately to be provided.

Figure 1A:
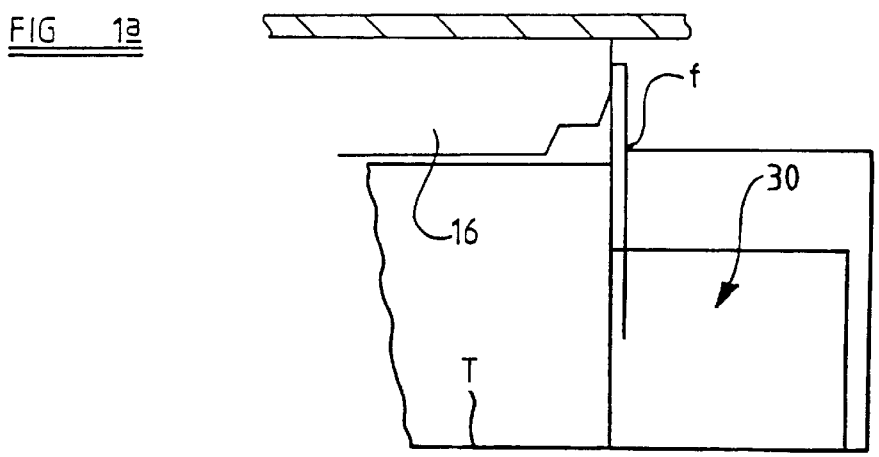
FIG. 1a is a fragmentary view similar to FIG. 1 but of a different embodiment.

The monitoring means 30 may include an instrument which is integrally provided with a tool T, such as a ratchet spanner (see FIG. 1a), used for tightening the female threaded member 16, or may be provided separately. It is envisaged that such monitoring means 30 would attach to the female threaded member 16 so that deformation of the shoulder 24 or other part of the female threaded member 16 may readily be monitored. The monitoring instrument may be an optical, acoustic or even mechanical instrument, or an instrument with operates using a combination of optical, mechanical and acoustic means.

Where the instrument 30 is an optical instrument I, as shown in FIG. 1, the instrument I may direct a light beam 34 onto the shoulder 24 and detect reflected light. If, as shown in FIG. 1, the light beam is incident transversely of the shoulder 24, deflections of the shoulder 24 may be determined by moving the beam. Alternatively, the light beam may be incident axially on the shoulder 24 as indicated in dotted lines at 34a. The light beam may be a collimated light beam and deformation of the shoulder 24 may be monitored by monitoring interference patterns for example, in the reflected light. Other optical arrangements may be provided to monitor the extent of deformation of the shoulder formation 24 or other part of the fitting 10 as the female threaded member 16 is tightened.

Where the instrument 30 is an acoustic instrument, this may generate, for example, ultrasonic waves 34 which are directed preferably axially onto the shoulder formation 24 or other part being monitored, and reflected waves may be received by a receiver R which determines from the reflected waves the amount of deformation of the shoulder formation 24 or other part. For example the transmitted and reflected ultrasonic waves may constructively or destructively interfere to give a measure of the amount of deformation occurring, and such interference may be observed optically, acoustically or even using pressure sensing means.

Where the instrument 30 is a mechanical instrument (see FIG. 1a), this may include a feeler f which bears on the shoulder formation 24 or other part to be monitored, which is moved as the shoulder formation 24 or other part deforms, the amount of the feeler f movement being determined with reference to a Vernier or similar scales.

Preferably, to minimise the degree of skill required to monitor the deformation of the shoulder formation 24 or other monitored part, there is included an indicator means 35 which may indicate to a fitter tightening the female threaded member 16, when this has been tightened to a desired tightness. Such indicator means may most simply have an indicator light and/or audible means, which operates when a desired tightness has been achieved. Such indicator means 35 may be provided integrally with the monitoring instrument, or separately therefrom as desired.

The method of the present invention my be used to reveal when component parts of a connection have been intermixed. For example if the female threaded member 16 of the connection described is replaced by a member which does not have a weakened region 32, or at least by a female threaded member which has a weakened region designed differently from the weakened region of the original component, the optical instrument may be sufficiently intelligent to determine that any deformation of the shoulder formation 24 or other monitored part is unusual. Most simply no deformation may be determined, or an excess of deformation may be perceived.

If desired means may be provided to correlate the amount of rotation of the female threaded member 16 relative to the body 12 to tighten the member 16 with an expected amount of deformation of the shoulder formation 24 or other monitored part.

Referring now to FIG. 3 a fragmentary section through an alternative connection formed by the method described is shown and similar parts are labelled with the same reference numerals.

In this embodiment though, the radially extending formation 24 of the female threaded member 16 is inclined relative to the axis of the tube 11 at an angle of greater than 90°. A generally radially extending internal surface s1 of the formation 24 which extends from radially outwardly extending groove 32 is inclined at a similar angle, as is another surface s2 which bears on the second annular compression element 20. In this way, movement of the generally radially extending formation 24 is enhanced, as the female threaded member 16 is tightened. Movement of the radially inwardly extending part 24 of the female threaded member 16 relative to the remainder of the member 16 may be determined by any of the methods described above with reference to FIGS. 1 and 2.

Figure 4:
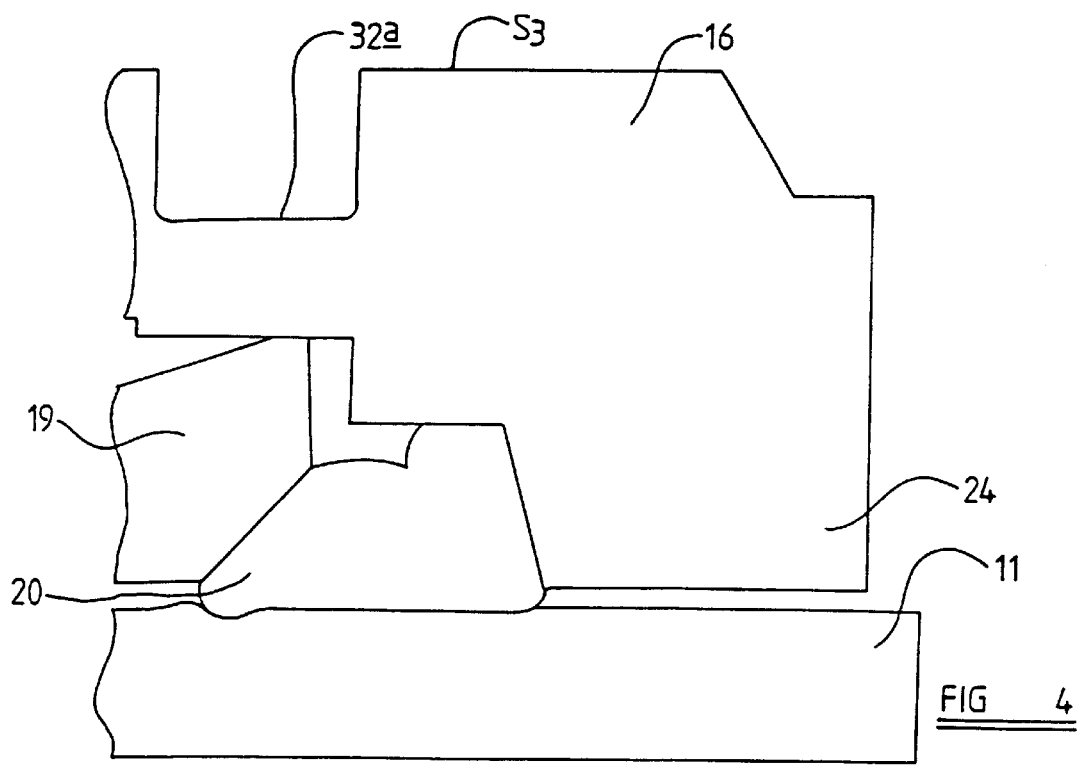
FIG. 4 is a view similar to FIG. 3 but illustrating another way of determining movement.

In FIG. 4, the radially inwardly extending formation 24 is again generally normal to the tube 11, as in the FIGS. 1 and 2 embodiment. In this example though, an annular inwardly extending groove 32a is provided in an external surface s3 of the female threaded member 16. In use, as the female threaded member 16 is tightened, the radially extending formation 24 will tend to move relatively to the portion of the member 16 adjacent the internal threads and so the length of the groove 32a will be stretched. Thus by monitoring the length of the groove 32a, a determination can be made of the tightness of the female threaded member 16 on the body 12. Changes in groove length may be measured optically using a beam of light directed onto the edges of the groove 32a, although other measurement methods involving acoustic, or mechanical methods may instead be used.

Figure 5:
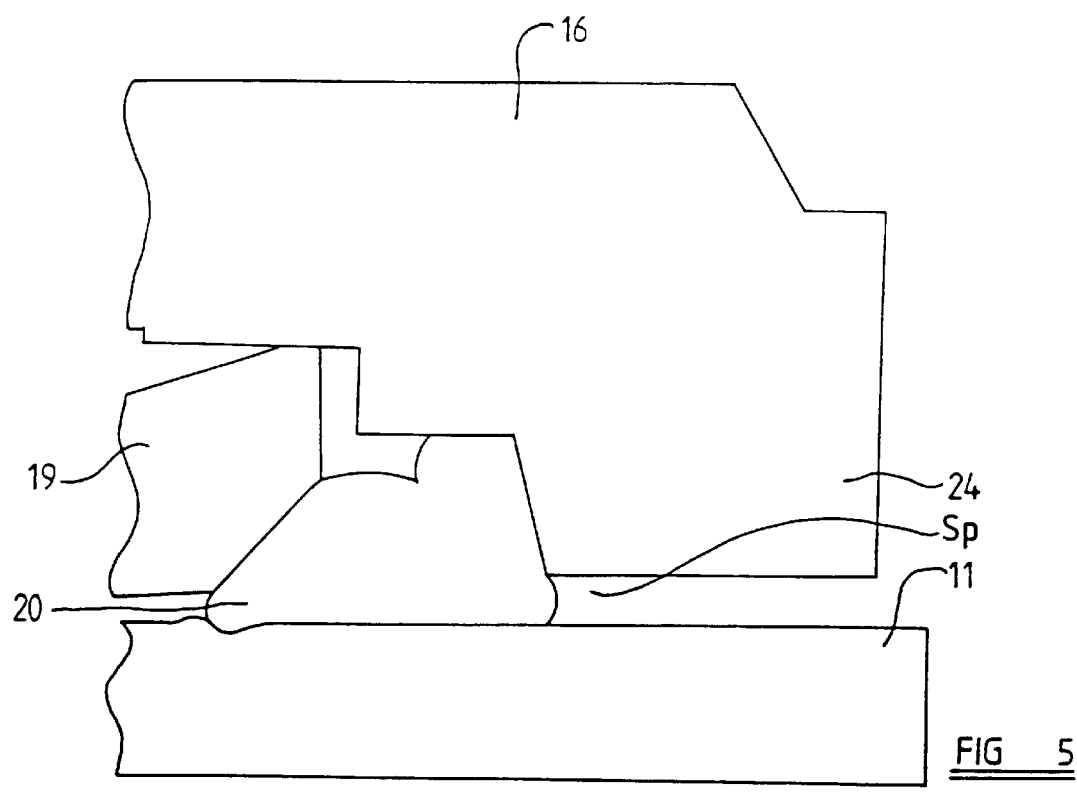
FIG. 5 is yet another view similar to FIGS. 3 and 4 but illustrating yet another alternative way of determining movement.

In the arrangement of FIG. 5, the circular opening of radially inwardly extending portion 24 of the female threaded member 16 which receives the tube 11 is larger than in the other arrangements illustrated. Usually, with at least some fittings 10, the second annular compression element 20 will deform as the fitting 10 is tightened such that a portion of the element 20 moves into a space sp between the radially inwardly extending portion 24 and the tube 11. As in this arrangement, the space sp size is enhanced, increased deformation will be encouraged as the female threaded member 16 is tightened.

By determining the amount of such movement, e.g. by an optical method in which a light beam is shone into space sp and reflections received from the second annular compression element 20, a measure of the tightness of the female threaded member 16 on the body 12 can be determined.

Figure 6:
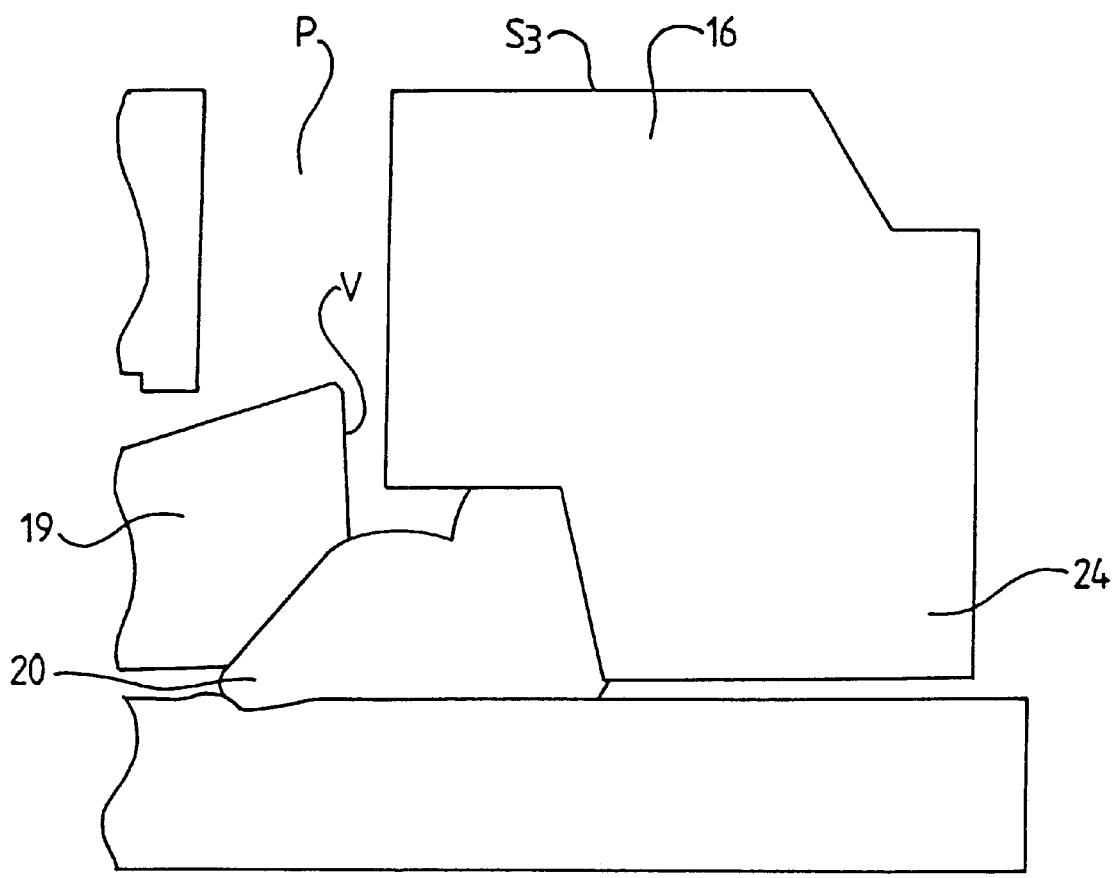
FIG. 6 is a view again similar to FIGS. 3 to 5 but illustrating a preferred way of determining movement of a moveable part of the fitting.

In FIG. 6, it can be seen that an opening P has been provided in the side wall 53 of the female threaded member 16 so that a rear edge part V of the first annular compression element 19 can be seen. The edge V will move as the female threaded member 16 is tightened, axially of the fitting 10 towards the body 12, as the radially inwardly extending formation 24 of the female threaded member 16 bears on the second compression element 20. Thus a determination of the tightness of the female threaded member 16 on the body 16 can be made, by determining the amount of movement of the edge V. Such a method lends itself to a simple optical determination through the opening P in the female threaded member 16, which preferably extends radially as indicated, and conveniently is drilled in the female threaded member 16 and is thus generally circular in cross section.

In yet another arrangement (not shown) an opening such as a radially extending slot, may be provided in the radially inwardly extending formation 24, to enable the position of edge V of the first compression element 19, or a part of the second compression element 20 to be monitored e.g. by an optical method.

If desired, data including information about the amount of movement of the observed part as the female threaded member 16 is tightened, may be fed to a data storage means such as a computer where it is stored in memory. Such data may be compared with subsequent data obtained from the connection concerning any change in the position of the observed part. Thus for example, in the FIG. 6 arrangement, later obtained data containing information about the position of the edge V of the first annular compression element 19 may indicate that the edge V has moved since the female threaded member 16 was initially tightened. This may indicate impending failure of the connection and enable remedial works to be carried out. Such movement subsequent to initial tightening of the female threaded member 16 may be as a result of loosening of the member 16 caused by fluctuations in pressure of the fluid conveyed by the connection, or otherwise, e.g. by vibrations experienced in use.

Such subsequent data may be obtained from a monitoring means which may be an integral part of the connection, and permanently connected to the computer so that the status of the connection can be checked at any time required by the computer.

Alternatively, such subsequent data may be obtained by a manual determination of any change in position of the part observed during initial tightening of the female threaded member 16.

Where a computer is used as a data storage means, this may be arranged to provide a warning in the event that a movement of the observed part of the fitting subsequent to initial tightening is determined, or at least such warning may be given in the event that such movement is greater than a threshold amount which might indicate impending connection failure.

The monitoring means may itself be intelligent, and may thus ignore small changes in observed part position occurring subsequent to initial tightening as a result of, for example thermal conditions.

Figure 7:
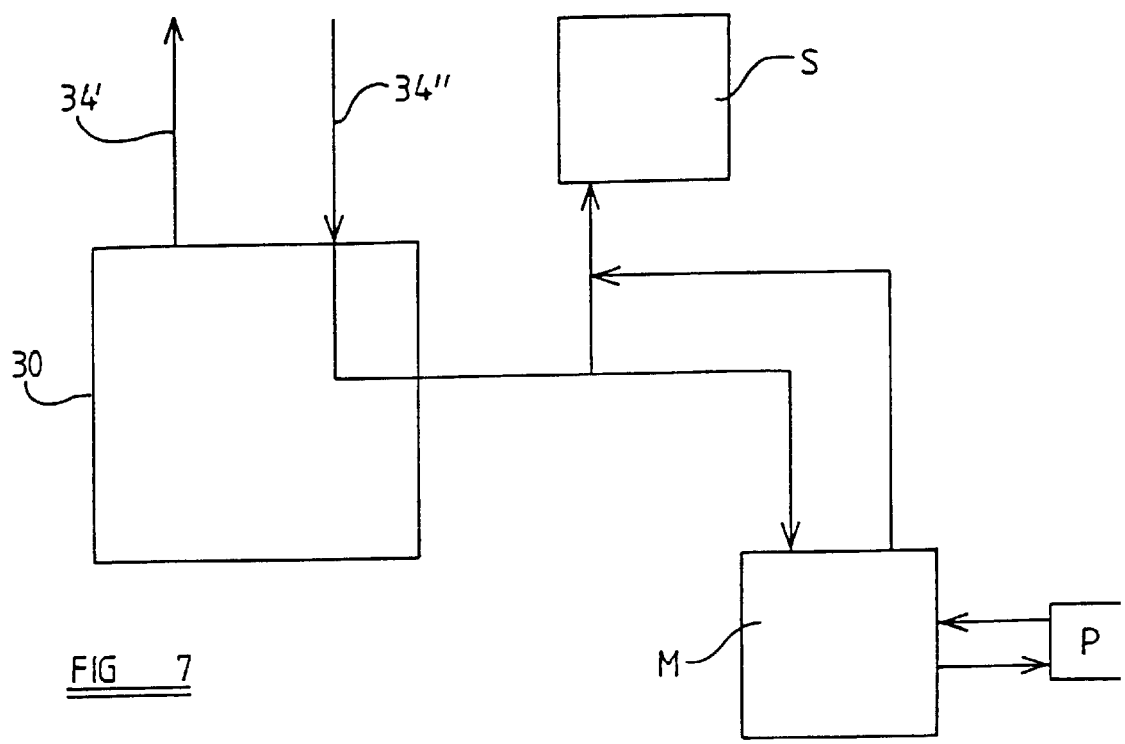
FIG. 7 is an illustrative view of an imaging apparatus which may be used in the invention.

Referring to FIG. 7 there is shown a monitoring means 30 which is adapted to collect data relating to the amount of movement of, for example one of the first and second compression elements 19, 26, or of another internal part of the connection, by subjecting the connection to ultrasonic vibrations 34', receiving reflected vibrations 34". The data thus collected preferably is useable to form an image of the internal parts of the connection on a screen S, and the data may be stored in a data storage device such as a memory M.

As the female threaded member 16 is tightened, the image on the screen S may be compared with a reference image manually, or by a processing means P with data for a reference image stored in the memory M, to establish the extent of movement of the moveable part of the connection due to tightening. Thus in the event that it is established that the moveable part has moved insufficiently for a desired degree of joint tightness, the female threaded member 16 may continue to be tightened until the image data corresponds with the reference image.

Of course, if desired, instead of or in addition to the image being displayed on a screen, the image may be printed and a printed image compared with a printed reference image. Where the image is to be compared with a reference image using a screen S only, the reference and collected image may simultaneously be displayed on the screen S side by side or superimposed for examples, as desired to facilitate comparison.

It will be appreciated that the screen S may be located remotely from the connection being made, and thus an operator making the connection, e.g. a diver, may receive instructions from a remote operator viewing the screen S or otherwise comparing images, to continue to tighten the female threaded member 16 or not, to achieve a desired joint tightness.

Figure 8:
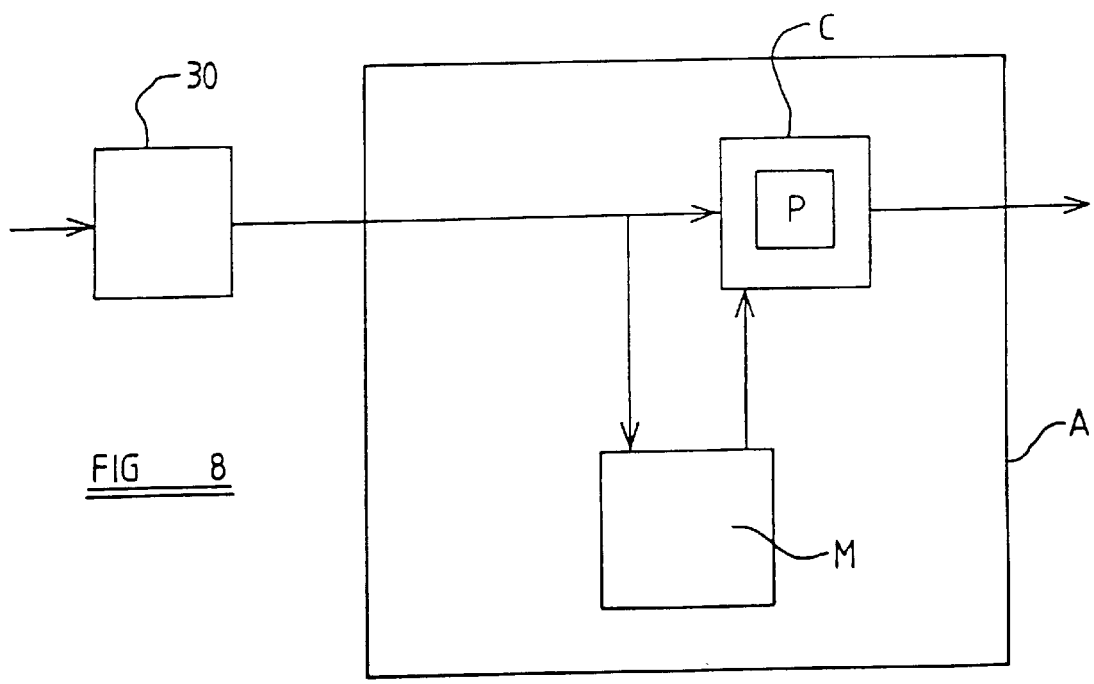
FIG. 8 is an illustrative view of a monitoring apparatus which may be used in the invention.

Referring to FIG. 8 there is shown an apparatus A for use in a connection monitoring method The apparatus A may be used in conjunction with any of the joint forming and monitoring methods described above. An instrument 30, for collecting data relating to the connection formed as described above collects data when the connection is made, and this is stored in a data storage device or memory M.

At any desired time subsequently, for example continuously, or intermittently e.g. after a predetermined service interval, the instrument 30, or another suitably calibrated instrument 30, collects fresh data. The fresh data is compared with the original data in a comparitor means C and in the event that it is determined that since originally tightening the joint there has been a movement of the moveable part of the connection beyond a threshold amount, the apparatus A may issue a warning signal, such as an audible and/or visual warning or a simple indication in data concerning the connection from which such movement can be discerned. A processing means P may make the comparison substantially intelligently.

In FIG. 8, the comparison of the original and fresh data is performed by a comparitor means, but in another method, could be compared manually. For example in the method described with reference to FIG. 7, an image of the internal parts of the connection stored when the connection was originally made may be compared manually with a corresponding image obtained subsequently on the screen S, or by comparing printed images, thus to monitor the tightness etc. of the connection previously formed.

What is claimed is:

1. A method of forming a connection between a tube and a fitting, the fitting including a body with an externally male threaded tube receiving part to receive a tube, and a female threaded member adapted to be engaged with the male thread of the body with a compression means therebetween, the method including the steps of arranging the female threaded member and the compression means around the tube, inserting the tube into the tube receiving part of the body, tightening the female threaded member onto the tube receiving part so that a generally radially inwardly extending formation of the female threaded member bears upon the compression means, determining the amount of movement of a part of the fitting which, as the female threaded member is tightened, is caused to move relative to another part of the fitting, wherein the part the amount of relative movement of which is determined is the generally radially inwardly extending formation of the female threaded member which, when the female threaded member is tightened, moves relative to the remainder of the female threaded member generally axially of the connection, and providing the female threaded member of the fitting with a weakened region located such that, as the female threaded member is tightened, movement of the formation is enhanced.

2. A method according to claim 1 wherein the weakened region is provided so as only to permit deformation of the formation within the elastic limit of the material from which the fitting is made.

3. A method according to claim 1 wherein the weakened region includes an annular groove provided in a region of the female threaded member where the radially inwardly extending formation joins the remainder of the female threaded member.

4. A method according to claim 1 wherein the weakened region is a groove provided in an internal surface of the female threaded member.

5. A method according to claim 4 wherein the groove is axially adjacent to threads of the female threaded member.

6. A method of forming a connection between a tube and a fitting, the fitting including a body with an externally male threaded tube receiving part to receive a tube, and a female threaded member adapted to be engaged with the male thread of the body with a compression means therebetween, the method including the steps of arranging the female threaded member and the compression means around the tube, inserting the tube into the tube receiving part of the body, tightening the female threaded member onto the tube receiving part so that a generally radially inwardly extending formation of the female threaded member bears upon the compression means, determining the amount of movement of a part of the fitting which, as the female threaded member is tightened, is caused to move relative to another part of the fitting, wherein the part the amount of relative movement of which is determined is an axially extending portion of the female threaded member which moves axially of the connection when the female threaded member is tightened, forming a circumferential groove in an external surface of the female threaded member and determining a change in an axial length of the groove as a result of tightening of the female threaded member forming a circumferential groove in an external surface of the female threaded member, and determining a change in the axial length of the groove as a result of tightening of the female threaded member.

7. A method of forming a connection between a tube and a fitting, the fitting including a body with an externally male threaded tube receiving part to receive a tube, and a female threaded member adapted to be engaged with the male thread of the body with a compression means therebetween, the method including the steps of arranging the female threaded member and the compression means around the tube, inserting the tube into the tube receiving part of the body, tightening the female threaded member onto the tube receiving part so that a generally radially inwardly extending formation of the female threaded member bears upon the compression means, determining the amount of movement of a part of the fitting which, as the female threaded member is tightened, is caused to move relative to another part of the fitting, and wherein the part the amount of relative movement of which is determined is a portion of the compression means which, as the female threaded member is tightened, is deformed to move into a space between the female threaded member and the tube.

8. A method according to claim 7 wherein the compression means includes first and second annular compression elements, the second element interacting with the first element as the female threaded member is tightened, to urge the first element into engagement between the tube receiving part and the tube and the portion of the compression means which is deformed into the space between the female threaded member and the tube, is a rear portion of the second annular compression element on which the radially inwardly extending formation bears.

9. A method according to claim 7 which includes providing a circular opening in the female threaded member of a first diameter, to receive the tube, which diameter is greater than is required to receive the tube, to provide an enlarged space into which a rear portion of a second annular compression element may deform.

10. A method of forming a connection between a tube and a fitting, the fitting including a body with an externally male threaded tube receiving part to receive a tube, and a female threaded member adapted to be engaged with the male thread of the body with a compression means therebetween, the method including the steps of arranging the female threaded member and the compression means around the tube, inserting the tube into the tube receiving part of the body, tightening the female threaded member onto the tube receiving part so that a generally radially inwardly extending formation of the female threaded member bears upon the compression means, and using an instrument to determine the amount of movement of the part of the fitting which, as the female threaded member is tightened, is caused to move relative to another part of the fitting, the instrument being operated in conjunction with a tool used to tighten the female threaded member, and wherein the tool and the instrument are integrated.

11. A method of forming a connection between a tube and a fitting, the fitting including a body with an externally male threaded tube receiving part to receive a tube, and a female threaded member adapted to be engaged with the male thread of the body with a compression means therebetween, the method including the steps of arranging the female threaded member and the compression means around the tube, inserting the tube into the tube receiving part of the body, tightening the female threaded member onto the tube receiving part so that a generally radially inwardly extending formation of the female threaded member bears upon the compression means, and determining the amount of movement of a part of the fitting which, as the female threaded member is tightened, is caused to move relative to another part of the fitting, and collecting data from the connection and comparing the data with reference data to determine the amount of movement of the part of the fitting achieved during tightening, the data collecting step including forming an image of the internal parts of the connection by subjecting the connection to ultrasonic vibrations and receiving ultrasonic vibrations reflected from the internal parts of the connection, and comparing the image with a reference image to determine the amount of movement of the part of the fitting achieved during tightening.

12. A method according to claim 11 wherein the method includes continuing to tighten the female threaded member until the amount of movement of the part of the fitting is determined to be a predetermined amount of movement.

13. A method of forming a connection between a tube and a fitting, the fitting including a body with an externally male threaded tube receiving part to receive a tube, and a female threaded member adapted to be engaged with the male thread of the body with a compression means therebetween, the method including the steps of arranging the female threaded member and the compression means around the tube, inserting the tube into the tube receiving part of the body, tightening the female threaded member onto the tube receiving part so that a generally radially inwardly extending formation of the female threaded member bears upon the compression means, determining the amount of movement of a part of the fitting which, as the female threaded member is tightened, is caused to move relative to another part of the fitting, and monitoring the connection by providing a data storage means and providing original data relating to the amount of movement of the part of the fitting achieved during tightening of the female threaded member to said data storage means, reexamining the connection to produce fresh data, and comparing the original data and the fresh data to determine any change of position of the moveable part occurring since tightening.

14. A method according to claim 13 wherein the data which is stored is of an image of internal parts of the connection.

15. A method according to claim 14 wherein the original and fresh data are compared manually.

16. A method according to claim 14 wherein the original and fresh data are compared by a data comparison means which produces an output signal indicative of any change of position of the moveable part of the connection occurring since tightening.

17. A method according to claim 13 wherein the method includes providing the connection with a monitoring means which provides a warning signal in the event that a movement of the moveable part subsequent to tightening, beyond a threshold amount, is determined.

18. A method according to claim 17 wherein the monitoring means includes a processing means and the method includes providing a warning in the event that a movement of the moveable part subsequent to tightening, beyond a threshold amount, is determined.

19. A method of forming a connection between a tube and a fitting, the fitting including a body with an externally male threaded tube receiving part to receive a tube, and a female threaded member adapted to be engaged with the male thread of the body with a compression means therebetween, the method including the steps of arranging the female threaded member and the compression mean around the tube, inserting the tube into the tube receiving part of the body, tightening the female threaded member onto the tube receiving part so that a generally radially inwardly extending formation of the female threaded member bears upon the compression means, and determining the amount of movement of a part of the fitting-which, as the female threaded member is tightened, is caused to move relative to another part of the fitting, and forming an image of internal parts of the connection by subjecting the connection to ultrasonic vibrations and receiving ultrasonic vibrations reflected from the internal parts of the connection, and comparing the image with a reference image to determine the amount of movement of the part of the fitting achieved during tightening.

* * * * *

UNITED STATES PATENT AND TRADEMARK OFFICE
CERTIFICATE OF CORRECTION

PATENT NO. : 6,438,814 B1
DATED : August 27, 2002
INVENTOR(S) : Seymour et al.

It is certified that error appears in the above-identified patent and that said Letters Patent is hereby corrected as shown below:

<u>Column 14,</u>
Line 9, delete "mean" and insert -- means --.

Signed and Sealed this

Eleventh Day of March, 2003

JAMES E. ROGAN
*Director of the United States Patent and Trademark Office*